United States Patent Office 3,350,422
Patented Oct. 31, 1967

3,350,422
CATALYTIC EPOXIDATION OF AN OLEFINICALLY UNSATURATED COMPOUND USING AN ORGANIC HYDROPEROXIDE AS AN EPOXIDIZING AGENT
John Kollar, Wallington, N.J., assignor to Halcon International, Inc., a corporation of Delaware
No Drawing. Filed Feb. 1, 1966, Ser. No. 523,895
6 Claims. (Cl. 260—348.5)

This case is a continuation-in-part of copending applications Ser. No. 248,284 filed Dec. 31, 1962, Ser. No. 251,053 filed Jan. 14, 1963, Ser. No. 336,150 filed Jan. 7, 1964, Ser. No. 375,309 filed June 15, 1964, Ser. No. 370,107 filed May 25, 1964, Ser. No. 375,313 filed June 15, 1964, Ser. No. 375,258 filed June 15, 1964, all abandoned, and Ser. No. 414,575 filed Nov. 30, 1964.

This invention relates to the epoxidation of olefinically unsaturated organic compounds to the corresponding oxirane compounds and is particularly concerned with the catalytic epoxidation of the olefinically unsaturated organic compounds using organic hydroperoxides as epoxidizing agents.

*Prior work*

The general field of the epoxidation of olefins to oxirane compounds has long occupied persons skilled in the chemical arts.

It is known that olefins have greatly varying reactivity depending upon the size and structure. For example, D. Swern discusses the relative reactivities of olefins towards epoxidation in J.A.C.S. 69, 1962 (1947). Typically, the generalized compartive reactivities of olefins to epoxidation are:

*Relative rates of epoxidation*

| | |
|---|---|
| $CH_2=CH_2$ | |
| $RCH=CH_2$ | 1 |
| $RCH=CHR$ | 24 |
| $R_2C=CH_2$ | 500 |
| $R_2C=CHR$ | 500 |
| $R_2C=CR_2$ | 6500 |
| | very great. |

From this it can be seen that ethylene, and then olefins like propylene, are the most difficult of all olefins to epoxidize.

Prior workers have discovered that ethylene can be converted to ethylene oxide by vapor phase partial oxidation with molecular oxygen over a silver catalyst, and this is the method used for substantially all the commercial production of ethylene oxide. U.S. Patent 2,693,474 is illustrative of these successful efforts to prepare ethylene oxide.

However, the catalytic vapor phase molecular oxygen oxidation techniques are not applicable to other olefins even including the adjacent compound, propylene, which is the next most important commercial compound. In fact, the commercial production of propylene oxide mainly is accomplished by the cumbersome chlorohydrin route which comprises reacting propylene with hypochlorous acid to form propylene chlorohydrin and the dehydrochlorination of the propylene chlorohydrin to propylene oxide.

In light of the complexity and cost of the chlorohydrin route, workers have turned to other possible routes for the epoxidation of propylene and other olefins. One route which has proved successful insofar as being capable of actually producing at least limited yields of propylene oxide and other oxides is the peracid route. This route involves the formation of a peracid, such as peracetic acid, through the reaction of hydrogen peroxide with the organic acid and the epoxidation of an olefin with the peracid. The disadvantages of the peracid route also are such as to preclude significant commercialization. The peracids themselves are extremely hazardous to handle and give rise to severe operation problems. The reagents are expensive, corrosive, and nonregenerable, inasmuch as the hydrogen peroxide is lost as water. The composition of the peracid epoxidation mixture contains chemicals ($H_2O$, AcOH, and $H_2SO_4$) which are highly reactive with the product epoxides, thus leading to many by-products (glycol, glycol monoester, glycol diester) which lower the overall efficiency. This problem becomes more severe with the less reactive olefins, in particular propylene.

The above techniques proving less than satisfactory, research workers investigated other possible routes, especially for the production of the important and valuable propylene oxide. Attempts were made to utilize hydrogen peroxide in epoxidations. Hydrogen peroxide had long been known as a hydroxylation agent for converting compounds having olefinic unsaturation to alpha-beta dihydroxy compounds. Osmium tetraoxide has traditionally been employed as the catalyst to effect hydroxylation of olefins by hydrogen peroxide. $MnO_2$ has also been used. More recently workers found that various less reactive catalysts such as tungsten and molybdenum oxide enhance the hydroxylation of olefins. See U.S. Patents 2,613,223 and 2,754,325.

Neither osmium or manganese in any chemical forms has shown any catalytic effect, by the instant worker, in the epoxidation of olefins, regardless of reactivity, with hydroperoxides.

Thus, it can be seen that the hydroxylation reaction cannot be equated to an epoxidation and the glycol product resulting from the hydroxylation is not practically convertible to the epoxide.

Later work by one of the inventors of U.S. Patent 2,754,325 as contained in U.S. Patent 2,786,854 reported that epoxides could be formed by reaction of olefins with hydrogen peroxide provided the reaction mixture was not exposed to a temperature in excess of 100° C. until all catalyst had been separated, or provided, where a hydroxy olefin is reacted, that a neutral salt of a tungstic acid is used. See U.S. Patent 2,833,788.

Hydrogen peroxide, however, is not effective in the epoxidation of olefins such as propylene as demonstrated subsequently by work done by the instant worker. Also, of course, hydrogen peroxide has the obvious disadvantages of cost and non-regenerability as well as water formation which causes product loss.

Some more recent work with exceedingly reactive, substituted olefins has reported the epoxidation of alpha-beta ethylenic ketones and aldehydes with organic hydroperoxides at carefully controlled pH conditions. See U.S. Patents 3,013,024 and 3,062,841.

Some older work, also with hydroperoxide was done. In a paper by Hawkins the low yield epoxidation of higher molecular weight and more reactive olefins with an organic hydroperoxide in the presence of vanadium pentoxide catalyst was described. Hawkins was able to obtain a yield at 36% of cyclohexene oxide from cyclohexene and cumene hydroperoxide. With less reactive octene-1 a yield of only 14% was obtained. After the discoverey of the claimed catalysts in this patent application, Brill and Indictor have shown that with a less reactive hydroperoxide such as t-butyl hydroperoxide the epoxide of cyclohexene could be obtained in a 32% yield and octene-1 in a 10% yield in the complete absence of catalyst.

These facts demonstrate the need in the chemical field for more effective catalysts for use in epoxidizing olefins with hydroperoxides.

The use of hydroperoxides in the epoxidation of olefins such as propylene offers very important and distinct advantages over the use of chlorohydrin technology or over the use of peracids or hydrogen peroxide. Hydroperoxides are relatively inexpensive and convenient and safe to handle. In addition, hydroperoxides can readily be obtained and maintained in anhydrous form thus minimizing potential epoxide recovery and purification problems. Also as will later be developed, frequently the hydroperoxide can be converted into a derivative as a result of the epoxidation from which the hydroperoxide can be conveniently regenerated or which itself can be readily converted to other valuable products.

Despite the enormous expenditures of effort and money the convenient and efficient epoxidation of propylene eluded prior workers. The chlorohydrin process, while practiced commercially, has such serious disadvantages as to have greatly held back propylene oxide development due to high product cost. The peracid route was not practical due to inherent process hazards and high cost. Hydrogen peroxide has not proved technically successful as a propylene epoxidation agent and hydroperoxides proved not to be effective when following the teaching of the prior art.

Objects of the invention

With the above in mind, it was the primary object of the present inventor to find an improved method for epoxidizing propylene and other olefinically unsaturated compounds to the oxirane derivatives. A special object was to find such an epoxidation process which employed organic hydroperoxides as the essential epoxidizing agent. Other objects can be seen from the following description of the invention.

The invention

Now, in accordance with the present invention a method has been discovered for the epoxidation of propylene as well as other olefinically unsaturated compounds to the corresponding oxirane derivatives employing organic hydroperoxides as the epoxidizing agents. Specifically, it has been found that these olefinically unsaturated materials can be successfully epoxidized conveniently and in exceedingly good yield through reaction with the organic hydroperoxides provided the reaction is carried out in the presence of certain catalytic materials as hereinafter described in particular detail. During the reaction, the hydroperoxide is converted almost quantitatively to the corresponding alcohol and it is within the scope of this invention to recover this alcohol as a coproduct of the process, or alternatively to convert the alcohol to a form for reuse in the process, or to convert the alcohol to another, more desirable coproduct.

Olefinically unsaturated reactants

The need has long been greatest for a novel and successful route to propylene oxide through the epoxidation of propylene. The present invention is uniquely adapted for this successful conversion of propylene to propylene oxide. However, in addition to propylene the reaction system of the present invention can also be applied generally to the epoxidation of olefinically unsaturated materials.

Olefinically unsaturated materials which are epoxidized in accordance with the invention include substituted and unsubstituted aliphatic and alicyclic olefins which may be hydrocarbons or esters or alcohols or ketones or ethers or the like. Preferred compounds are those having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes cyclohexene, methyl cyclohexene, butadiene, styrene, methyl styrene, vinyl toluene, vinylcyclohexene, the phenyl cyclohexenes, and the like. Olefins having halogen, oxygen, sulfur and the like containing substituents can be used. Such substituted olefins are illustrated by allyl alcohol, methallyl alcohol, cyclohexanol, diallyl ether, methyl methacrylate, methyl oleate, methyl vinyl ketone, allyl chloride, and the like. In general, all olefinic materials epoxidized by method previously employed can be epoxidized in accordance with this process including olefinically unsaturated polymers having up to about several thousand carbon atoms. Illustrative olefins are linseed oil, olive oil, soybean oil, cottonseed oil, tall oil glycerides, castor oil, corn oil, butyl-polyglycol esters of unsaturated fatty acids, liquid or solid polybutadiene, polyisoprene, unsaturated copolymers of ethylene and propylene including terpolymers thereof with cyclopentadiene and the like.

The lower olefins having about 3 or 4 carbon atoms in an aliphatic chain are advantageously epoxidized by this process. The class of olefins commonly termed alpha olefins or primary olefins are epoxidized in the particularly efficient manner by this process. It is known to the art that these primary olefins, e.g., propylene, butene-1, decene-1, hexadecene-1, etc. are much more difficulty epoxidized than other forms of olefins, excluding only ethylene. Other forms of olefins which are much more easily epoxidized are substituted olefins, alkenes with internal unsaturation, cycloalkenes and the like.

The organic hydroperoxide reactant

The reaction of this invention is carried out broadly using an organic hydroperoxide reactant having the formula ROOH wherein R is an organic radical. If preferred practice R is substituted or unsubstituted alkyl, cycloalkyl, aralkyl, aralkenyl, hydroxyaralkyl, cycloalkenyl, hydroxycycloalkyl, and the like radical having about 3 to 20 carbon atoms. R may be a heterocyclic radical.

Illustrative and preferred hydroperoxides are cumene hydroperoxide, ethylbenzene hydroperoxide, tertiary butyl hydroperoxide, cyclohexanone peroxide, tetralin hydroperoxide, methyl ethyl ketone peroxide, methylcyclohexene hydroperoxide, and the like as well as the hydroperoxides of toluene, p-ethyl toluene, isobutylbenzene, di-isopropyl benzene, p-isopropyl toluene, o-xylene, m-xylene, p-xylene, phenyl cyclohexane, etc.

Particularly useful hydroperoxides are derived from alkylaromatic hydrocarbons having at least one hydrogen atom on a carbon adjacent to the ring. Alpha aralkyl hydrocarbons which are used in this invention have the general formula

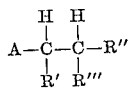

wherein each of R', R'', R''' can be hydrogen or an alkyl radical preferably having 1 to 20 carbon atoms, and A is an aromatic ring. The aromatic ring A, may be that of benzene and may be substituted with fluoro, chloro, bromo, nitro, alkoxyl, acyl or carboxyl (or esters thereof) groups. The ring may have one or more side chains with up to twelve carbon atoms in each chain, which chains may be branched. The alpha aralkyl hydroperoxides have the formula

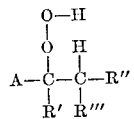

wherein R', R'', R''' and A are as above mentioned. Examples are the hydroperoxides of toluene, ethylbenzene, cumene, p-ethyltoluene, isobutylbenzene, tetralin, di-isopropylbenzene, p-isopropyltoluene, o-xylene, m-xylene, p-xylene, phenylcyclohexene, and the like. The preferred species are those derived from cumene, i.e. alpha, alpha dimethyl benzyl hydroperoxide, and ethyl benzene, i.e. alpha phenyl ethyl hydroperoxide. These aralkyl hydroperoxides give better reaction selectivities and faster reaction rates.

Most preferably, in the present invention the hydroperoxides are prepared through oxidation of the corresponding hydrocarbon. The oxidation is carried out using molecular oxygen as provided by air although pure oxygen as well as oxygen in admixture with inert gas in greater or lesser concentrations than air can be used. Oxidation temperatures broadly in the range 40° to 180° C., preferably 90° to 140° C. and pressure of 15 to 1,000 p.s.i.a. and preferably 30 to 150 p.s.i.a. can be used. The oxidation is continued until about 1 to 70%, and preferably about 10 to 50% of the alkylaromatic has been converted to hydroperoxide.

Various additives of known type can be employed during the alkylaromatic oxidation to promote hydroperoxide production.

The hydrocarbon oxidation effluent comprises a solution of the hydroperoxide in hydrocarbon along with some alcohol formed during the oxidation. This effluent can be employed in the epoxidation without concentrating the hydroperoxide, or the oxidation effluent can be distilled to first concentrate the hydroperoxide.

The catalyst

The epoxidation reaction of this invention is carried out in the liquid phase in the presence of an effective dissolved catalytic amount of a soluble vanadium compound.

The amount of soluble vanadium compound in solution used as catalyst in the epoxidation process can be varied widely, although as a rule it is desirable to use at least 0.00001 mol and preferably 0.002 to 0.03 mol per mol of hydroperoxide present. Amounts as low as 0.000001 mol per mol of hydroperoxide have an effect while amounts greater than about 0.1 mol seem to give no advantage over smaller amounts, although amounts up to 1 mol or more per mol of hydroperoxide can be employed. The catalysts remain dissolved in the reaction mixture throughout the process and can be reused in the reaction after removal of the reaction products therefrom.

The catalytic components are employed in the epoxidation reaction in the form of a compound or mixture which is initially soluble in the reaction medium. While solubility will, to some extent depend on the particular reaction medium employed, a suitably soluble substance contemplated by the invention would include hydrocarbon soluble, organo-metallic compounds of vanadium having a solubility in methanol at room temperature of at least 0.1 gram per liter. Illustrative soluble forms of the catalytic materials are the naphthenates, stearates, octoates, carbonyls and the like of vanadium. Various chelates, association compounds and enol salts, such, for examples, as aceto-acetonates may also be used.

It is advantageous to employ basic substances such as alkali metal compounds or alkaline earth metal compounds with the catalyst. Particularly preferred are the compounds of sodium, potassium, lithium, calcium, magnesium, rubidium, cesium, strontium, and barium. Compounds which are employed are those which most preferably are soluble in the reaction medium. However, insoluble forms can be employed and are effective when dispersed in the reaction medium. Organic acid compounds such as a metal acetate, naphthenate, stearate, octoate, butyrate, and the like can be employed. Additionally inorganic salts such as Na carbonate, Mg carbonate, trisodium phosphate, and the like can also be employed. Particularly preferred species of metal salts include sodium naphthenate, potassium, stearate, magnesium carbonate, and the like. Hydroxides and oxides of alkali and alkali earth metal compounds can be used. Examples are NaOH, MgO, CaO, Ca(OH)$_2$, KOH and the like, alkoxides, e.g. Na ethylate, K cumylate, Na phenate etc. can be used. Amides such as NaNH$_2$ can be used as can quaternary ammonium salts. In general, any compound of alkali or alkali earth metals giving a basic reaction in water can be used.

The basic compound is employed during the epoxidation reaction in amounts of .05 to 10 moles/mol of epoxidation catalyst desirably 0.25 to 3.0 and preferably 0.50 to 1.50 moles/mol. It has been found that as a result of the incorporation of the basic compound in the reaction system, significantly improved efficiencies in the utilization of the organic hydroperoxides in the epoxidation is achieved.

That is using the basic compound there results a higher yield of oxirane compound based on hydroperoxide consumed. Also, of the hydroperoxide consumed, a greater amount is reduced to alcohol instead of other undesirable products through the invention.

Additionally through use of the basic compound it is possible to employ lower unsaturated compound to hydroperoxide ratios and thus to improve unsaturated compound conversions while retaining satisfactory high reaction selectivities.

Reaction conditions

The reaction conditions which are employed in the epoxidations of this invention can vary quite broadly.

Temperatures which can be employed in the present invention can vary quite widely depending upon the reactivity and other characteristics of the particular system. Temperatures broadly in the range of about −20 to 200° C., desirable 0 to 150° C., and preferably 50–120° C. can be employed. The reaction is carried out at pressure conditions sufficient to maintain a liquid phase. Although sub-atmospheric pressures can be employed, pressures usually in the range of about atmospheric to about 1,000 p.s.i.g. are most desirable.

In the oxidation of the olefinic substrate, the ratio of substrate to organic peroxy compounds can vary over a wide range. Generally, mol ratios of olefinic groups in the substrates to hydroperoxide broadly in the range of 0.5:1 to 100:1, desirably 1:1 to 20:1 and preferably 2:1 to 10:1 are employed.

The concentration of hydroperoxides in the substrate oxidation reaction mixture at the beginning of the reaction will normally be one percent or more although lesser concentrations will be effective and can be used.

The substrate oxidation reaction can be carried out in the presence of a solvent, and in fact, it is generally desirable that one be used. In general, aqueous solvents are not contemplated. Among the suitable substances are hydrocarbons, which may be aliphatic, naphthenic or aromatic, and the oxygenated derivatives of these hydrocarbons. Preferably, the solvent has the same carbon skeleton as the hydroperoxide used, so as to minimize or avoid solvent separation problems.

It is generally advantageous to carry out the reaction to achieve as high a hydroperoxide conversion as possible, preferably at least 50% and desirably at least 90%, consistent with reasonable selectivities. Reaction times ranging from a minute to many hours, preferably about 10 minutes to 10 hours are suitable, while 20 minutes to 3 hours are usually employed.

In a preferred method, the epoxidation reaction is carried out in a controlled manner such that during the reaction the ratio of unsaturated compound to epoxidizing agent present at any time in the reaction zone is greater than the ratio of the total unsaturated compound and epoxidizing agent fed to the zone.

In this method, the organic hydroperoxide epoxidizing agent is added incrementally to the reaction zone. The addition can be controlled at such a rate so that a significant amount of hydroperoxide has reacted prior to addition of the next increment. For this type of operation, each increment of epoxidizing agent thus reacts in an environment having a ratio of unsaturated compound to epoxidizing agent which is higher than the overall ratio of the amounts of these materials added to the reaction zone.

It is surprising and unexpected that this regulation of the epoxidation reaction results in improved results due to the incremental epoxidizing agent addition, since residence times are necessarily considerably longer. During the reaction there is a build-up of product epoxide concentration in the reaction mixture. Surprisingly, despite the great reactivity of the epoxides, the product epoxide is sufficiently stable in the reaction system even at the longer residence times such that the advantages achieved by the control of reactant ratios far outweighs the disadvantages of longer residence times at very reactive conditions.

A preferred method for practicing this method in a continuous manner involves the provision of an elongated reaction zone through which the reactants continuously pass. The unsaturated compound together with a portion of the total epoxidizing agent to be employed is introduced into the reactor inlet and the reaction zone is maintained at suitable epoxidizing conditions by the provision of indirect heating or cooling means. At spaced intervals along the reaction zone, additional epoxidizing agent is introduced. The reaction product mixture is withdrawn through the outlet and thereafter treated for the recovery of the various components. As few as one supplemental epoxidizing agent addition point up to as many as are economically feasible can be used. Usually no more than 20 addition points are economic. Suitable catalyst and solvent can all be added with the epoxidizing agent at any or all of the supplemental introduction points.

Batch techniques can be employed. The batch reactor is charged with unsaturated compound reactant. Catalyst and solvent are also suitably charged to the reactor together with a portion of the total epoxidizing agent to be used, and the material in the reactor is brought to reaction temperature as by indirect heat exchange. Thereafter, during a reaction cycle, additional epoxidizing agent is introduced into the reaction zone. This additional epoxidizing agent can be continuously added at a controlled rate during all or part of the reaction or it can be added portionwise at intervals. Additional catalyst and other agents can also be added as needed or desired during the reaction. At the completion of the desired reaction, the product mixture is withdrawn and treated for the recovery of desired components.

It will be apparent that other techniques are possible for carrying out this method. For example, in a continuous system a column-type reactor with upward and downward flow can be employed with the addition of epoxidizing agent at various levels. A series of separate reactors can be employed with epoxidizing agent addition to each reactor. Many other methods are possible.

*Co-products*

As great advantage of this invention is the fact that during the epoxidation reaction the organic hydroperoxide, ROOH, is converted almost quantitatively to the corresponding alcohol, ROH. This alcohol can, itself be recovered as a valuable co-product of the process or reconverted to the hydroperoxide by procedures such as dehydration to olefin, hydrogenation of the olefin, and oxidation to hydroperoxide, or by hydrogenolysis to hydrocarbon followed by oxidation to hydroperoxide. Thus the epoxidizing agent is, during the epoxidation, converted to a product suitable for convenient regeneration of the hydroperoxide for further use.

In an outstanding procedure, wherein an aralkyl hydroperoxide is employed, the aralkanol formed is dehydrated to the corresponding styrene.

In this practice, the alpha aralkyl hydroperoxide which reacts to epoxidize the olefin is itself substantially quantitatively converted to the corresponding alpha aralkanol which has the formula

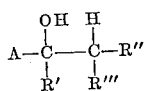

wherein R′, R″, R‴ and A have the aforementioned meaning. In accordance with this invention, the aralkanol is dehydrated to the corresponding styrene,

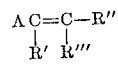

R′, R″, R‴ and A being as above.

Preferably, the epoxidation effluent is distilled in a series of distillation steps and/or in a multi-product column to isolate the various components, although other separation techniques can be employed. It is not necessary, although it is preferable, to separate the effluent components prior to the dehydration.

Prior to distillation to separate the epoxidation effluent components it is frequently desirable, although not essential, to treat the effluent with a base, or with hydrogen, or with a chemical reducing agent in order to reduce the acid catalyst characteristics and avoid premature alcohol dehydration.

The aralkanol is then dehydrated to the corresponding styrene product, preferably in a catalytic dehydration although thermal dehydrations are possible and feasible.

The dehydration catalyst for making styrene may be used in supported form or in pellets. Typical supporting materials are crushed sandstone, silica, filter stone, and ceramically bonded, fused aluminum oxide. For instance, the support may be wetted with water, titania powder amounting to about 10 to 15 percent of the support then sprinkled on, and the catalyst and support dried at 150° C. The activity of the titania powder may be increased by treating it with hot aqueous sulfuric acid (e.g., 10 percent), followed by thorough washing with water to remove the acid, before the titania is applied to the support. With titania supported on 4 x 6 mesh, ceramically-bonded, fused aluminum oxide production ratios of 400 to 650 grams of styrene per liter of catalyst per hour may be obtained. Higher production ratios are possible with the titania catalyst in pellet form, e.g., chemically pure anhydrous grade titanium dioxide powder is wetted with water and the resulting paste dried at 130° to 150° C. The dried cake is powdered and then pelleted. The pellets are then fired in a furnace at a temperature of at least 800° C., and they become very strong, mechanically. Then, they may be subjected to an activation step by immersion in boiling aqueous nitric acid (18–20 percent concentration) for a period of about 90 minutes, thorough washing with water, and drying at about 130° to 150° C. Instead of nitric acid, hydrochloric acid, phosphoric acid or sulfuric acid may be used for the acid treatment. At between 800° and 1000° C., there is a shrinkage of the pellet, and the pellets are harder and denser. These denser, harder pellets do not seem to be as readily activated by nitric acid as those roasted at 800°, even using the concentrated grade of nitric acid. They may be activated, however, by aqueous phosphoric acid of 20 percent concentration. With the denser, harder pellet dusting of the catalyst, e.g. during a charging operation, is largely eliminated, and for this purpose a roasting temperature of about 1000° C. is preferred.

In general, the smaller pellet size the better the production ratio. Pellet sizes measuring less than $3/16$ inch in the largest dimension are not practical, mechanically. Good production ratios are obtained with pellets measuring up to $3/8$ inch in one or more dimensions.

The desirable temperatures of dehydration are between 180° and 280° C. Usually it is necessary to use temperatures below 220° or above 250° C. At below 220° C. steam or reduced pressure may be employed to assist in vaporizing the aralkanol. Temperatures above about 250° to 280° C. may be employed with a high feed rate.

Other dehydration methods and catalysts may be used, and the dehydration can be carried out in liquid phase.

*Examples*

The following examples are presented to illustrate the invention.

Example 1

There are charged to a pressure reactor equipped with an agitator about 10 grams of cumene hydroperoxide, 10 grams of acetone, 0.5 gram of vanadium naphthenate which contains 3.4% by weight vanadium, and 31.1 grams of propylene. The reaction mixture is heated to 40° C., and reacted with agitation for 16 hours at a pressure in the range of about 150 p.s.i.g. The reaction mixture is subjected to a distillation to separate the product propylene oxide from the remaining components of the reaction mixture. About 55% of the hydroperoxide is converted to produce propylene oxide in a conversion selectivity of 22%.

Example 2

In this example, the epoxidation of propylene is conducted by charging into a pressure reactor 5.0 grams of cumene hydroperoxide, 5 gm. of cumyl alcohol 0.2 gram of vanadium naphthenate solution containing 3.4 wt. percent vanadium, and 15.4 grams propylene. The reaction mixture is heated to 90° C., and reacted without agitation for 3 hours at ambient pressure. The hydroperoxide conversion is 68.2% and the selectivity to propylene oxide based on hydroperoxide is 38%.

Example 3

A run is made to epoxidize cyclohexene to cyclohexene oxide using alpha phenyl ethyl hydroperoxide prepared by the air oxidation of ethylbenzene. About 50 grams of 35 wt. percent alpha phenyl ethyl hydroperoxide in ethylbenzene are mixed with 100 grams of cyclohexene. To a 5 gram sample of this mixture is added 0.02 gram of vanadium naphthenate solution containing 3.4 wt. percent vanadium and the same is reacted for 1 hour at 70° C. Conversion of hydroperoxide is 97% and selectivity of cyclohexene oxide formed based on hydroperoxide converted is 95%. The alpha phenyl ethanol (formed from the hydroperoxide on about a mol for mol basis) is converted in 80% or better yield to styrene by vapor phase dehydration at 200° to 250° C. over titania pellets or the like oxide catalyst at atmospheric pressure.

Example 4

Cyclohexene is converted to cyclohexene epoxide in a batch system.

A stirred reactor is charged with 123 g. cyclohexene, 100 g. of a 55% solution of ethylbenzene hydroperoxide in ethylbenzene, and 1.5 g. vanadium naphthenate containing 3.4% vanadium. The mixture is heated to 90° C. reaction temperature.

At 6 minute intervals 15 g. portions of the 55% solution of ethylbenzene hydroperoxide in ethylbenzene are added. A total of 150 g. is added in this manner.

After 90 minute reaction time ethylbenzene hydroperoxide conversion is 94% with 96% hydroperoxide selectivity to cyclohexene epoxide.

By way of contrast, where hydroperoxide is added initially to the reactor but with 30 minute residence time, hydroperoxide conversion is 97% with 87% selectivity to cyclohexene epoxide.

Example 5

There are charged to a reactor a liquid charge of 20 grams of 40% cumene hydroperoxide in cumene, 12.3 grams cyclohexane and 0.1 gram vanadium naphthenate (containing 3.4% by wt. vanadium). The reaction time was 1 hour and the temperature was 90° C. Using 100 mol percent sodium as the naphthenate based on vanadium conversion of hydroperoxide was 97.2% with 98.6% selectivity to cyclohexane epoxide. Without the sodium naphthenate, hydroperoxide conversion was 98.4% with 91.3% selectivity to cyclohexane oxide.

Example 6

By way of illustrating a difference in kind between the soluble vanadium catalysts of this invention and the insoluble forms such as $V_2O_5$ the following comparative runs were made:

Runs for the epoxidation of propylene to propylene oxide were performed using aralkyl hydroperoxide and various catalysts. The following table presents runs which are generally illustrative of the results obtained in a great number of experiments. In the runs given below, the propylene in the specified amount was contacted with the specified amounts of 89% cumene hydroperoxide, isopropanol solvent and catalyst in an autoclave for the specified time at the specified temperature. The hydroperoxide conversion is given as is the selectivity (based on hydroperoxide) to propylene oxide as determined by analysis of the product mixture.

TABLE 1

| Run | 1 | 2 | 3 |
|---|---|---|---|
| Propylene, gms | 17 | 17 | 17 |
| Hydroperoxide, gms | 9 | 9 | 9 |
| Solvent, gms | 24 | 24 | 24 |
| Catalyst | V Naph (3.4% V) | $V_2O_5$ | None |
| Gms | 0.2 | .1 | -------- |
| Time, hrs | 1 | 1 | 1 |
| Temp., °C | 110 | 110 | 110 |
| Hydroperoxide Conver., Percent | 72 | 34 | 21 |
| Selectivity, Percent | 38 | 6 | 4 |

The propylene oxide yield using vanadium naphthenate catalyst was 13.5 times that using vanadium pentoxide, clearly illustrating a difference in kind while the vanadium pentoxide result was little better than that achieved with no catalyst.

What is claimed is:

1. The method of preparing an oxirane compound which comprises reacting an olefinically unsaturated compound having 3 to 4 carbon atoms with an organic hydroperoxide in the presence of a soluble vanadium compound catalyst.

2. The method of claim 1 wherein the olefin is propylene.

3. The method of claim 1 wherein the catalyst is vanadium naphthenate.

4. The method of claim 1 wherein the reaction temperature is −20 to 200° C.

5. The method of claim 1 wherein the reaction is carried out in the presence of a basic compound.

6. The method of claim 1 wherein the hydroperoxide is added incrementally during the reaction.

References Cited

UNITED STATES PATENTS 3,013,024   8/1958   Payne _____ 260—348.5
3,062,841   11/1962  Yang et al. _____ 260—348.5

OTHER REFERENCES

Hawkins, E. G. E.: Jour. Chem. Soc. (London), (1950), pp. 2169–2173.

Yang et al.: Jour. Am. Chem. Soc. (1958) vol. 80, pp. 5845–8.

WALTER A. MODANCE, *Primary Examiner.*

N. S. MILESTONE, *Assistant Examiner.*